US008799610B2

(12) United States Patent
Gura et al.

(10) Patent No.: US 8,799,610 B2
(45) Date of Patent: Aug. 5, 2014

(54) MEMORY CLEAR OPERATIONS IN WAGERING GAME MACHINES

(75) Inventors: Damon E. Gura, Chicago, IL (US); Steven J. Lee, Elmhurst, IL (US); Samuel D. Ralston, Chicago, IL (US); Jorge Luis Shimabukuro, Las Vegas, NV (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 167 days.

(21) Appl. No.: 12/914,704

(22) Filed: Oct. 28, 2010

(65) Prior Publication Data

US 2012/0108346 A1 May 3, 2012

(51) Int. Cl.
*G06F 12/00* (2006.01)
*A63F 13/00* (2014.01)

(52) U.S. Cl.
USPC ................. 711/170; 463/29; 463/42; 463/43; 711/162

(58) Field of Classification Search
USPC ................................ 463/29, 42–43; 711/170
See application file for complete search history.

(56) References Cited

U.S. PATENT DOCUMENTS

| | | | | |
|---|---|---|---|---|
| 5,577,220 | A * | 11/1996 | Combs et al. | 711/206 |
| 6,519,677 | B1 * | 2/2003 | Fuente | 711/112 |
| 2002/0057800 | A1 * | 5/2002 | Gordon et al. | 380/251 |
| 2003/0073497 | A1 * | 4/2003 | Nelson | 463/42 |
| 2004/0063495 | A1 * | 4/2004 | LeMay et al. | 463/42 |
| 2006/0116208 | A1 * | 6/2006 | Chen et al. | 463/43 |
| 2007/0207854 | A1 * | 9/2007 | Wolf et al. | 463/29 |
| 2007/0266220 | A1 * | 11/2007 | Nelson | 711/170 |
| 2008/0096656 | A1 * | 4/2008 | LeMay et al. | 463/31 |
| 2009/0055611 | A1 * | 2/2009 | Adiraju et al. | 711/162 |
| 2011/0119754 | A1 * | 5/2011 | Larsen et al. | 726/16 |

* cited by examiner

*Primary Examiner* — Dmitry Suhol
*Assistant Examiner* — Jason Yen
(74) *Attorney, Agent, or Firm* — Nixon Peabody LLP

(57) ABSTRACT

Apparatus, systems, and methods may operate to receive a signal that enables execution of instructions forming a memory clear process, wherein the instructions are included in an operating system of a wagering game machine. Additional activities may include executing the instructions by at least one processor to clear at least a portion of nonvolatile memory in the wagering game machine and initializing the operating system to enable receiving a wager from a player in association with a wagering game to be played on the wagering game machine. Additional apparatus, systems, and methods are disclosed.

22 Claims, 7 Drawing Sheets

MEMORY CLEAR OPERATIONS IN WAGERING GAME MACHINES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc. All rights reserved.

BACKGROUND

Wagering game machines, such as slot machines, video poker machines, and the like, have been a cornerstone of the gaming industry for many years. Generally, the popularity of such machines depends on the likelihood (or perceived likelihood) of winning money at the machine, and the intrinsic entertainment value of the machine relative to other available gaming options. Where the available gaming options include a number of competing machines and the expectation of winning at each machine is roughly the same (or believed to be the same), players are most likely attracted to what they see as the most entertaining and exciting of the machines. Consequently, shrewd operators strive to employ the most entertaining and exciting machines available because such machines attract frequent play and increase profitability for the operator.

To provide increased entertainment value, as well as reliability of operation, many wagering game machines are computerized, operating under the control of one or more processors that store game data in various types of memory. For a variety of reasons, including periodic maintenance, machines that provide computerized wagering games are taken off-line so that some or all of the memory can be cleared. The process of clearing memory can take a significant amount of time, reducing potential revenue for gaming machine operators.

DETAILED DESCRIPTION

Operating Environment

In various embodiments, the challenges mentioned above, among others, are addressed by including instructions to clear memory within a wagering game machine, or associated with a wagering game machine, in an operating system (OS) associated with the machine. The OS may in fact comprise the base OS used to operate the machine itself. A variety of different mechanisms for implementing this solution will now be described.

Figure 1:
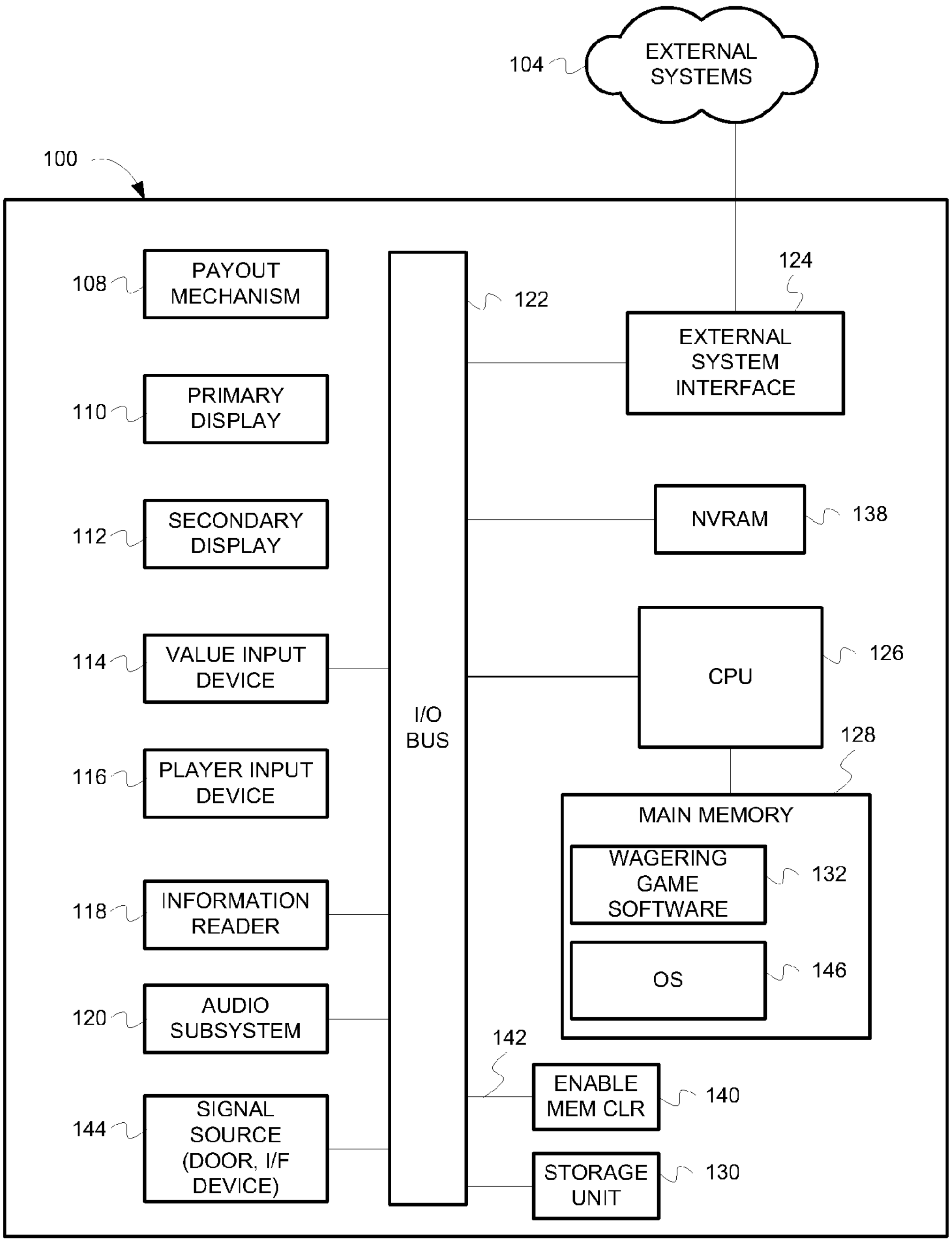
FIG. 1 is a block diagram illustrating a wagering game machine according to various embodiments of the invention.

FIG. 1 is a block diagram illustrating a wagering game machine 100 according to various embodiments of the invention. Here it can be seen that the machine 100 comprises a central processing unit (CPU) 126 connected to main memory 128, which includes wagering game presentation software 132. An NVRAM (Non-Volatile Random Access Memory) module 138 is connected to the CPU 126 via the input/output (I/O) bus 122 (the NVRAM module 138 may be directly connected to the CPU 126 in some embodiments.

In some embodiments, the NVRAM module 138 is a battery-backed random access memory (RAM). In other embodiments, the NVRAM module 138 comprises a flash memory module, magnetic RAM, FeRAM, phase-change memory (PRAM), optical RAM (ORAM), carbon nanotube technology, some combination of these types, or other types of memory capable of preserving information when operational power is removed. In one embodiment, the wagering game machine 100 can receive wagers and conduct wagering games, such as video poker, video black jack, video slots, video lottery, etc.

The I/O bus 122 facilitates communication between components of the wagering game machine 100. The I/O bus 122 is connected to a payout mechanism 108, primary display 110, secondary display 112, value input device 114, player input device 116, information reader 118, audio subsystem 120, and storage unit 130 (e.g., a disk drive or flash memory device). The player input device 116 can include the value input device 114 to the extent the player input device 116 is used to place wagers. In one embodiment, the value input device 114 can electronically receive wagering value (e.g., monetary value) from a player's casino account or other suitable "cashless gaming" value source. The I/O bus 122 is also connected to an external system interface 124, which is in turn connected to external systems 104 (e.g., wagering game networks).

In one embodiment, the machine 100 can include additional peripheral devices and/or more than one of each component shown in FIG. 1. For example, in one embodiment, the machine 100 can include multiple external system interfaces 124 and multiple CPUs 126. In one embodiment, any of the components can be integrated or subdivided. Additionally, in one embodiment, the components of the machine 100 can be interconnected according to any suitable interconnection architecture (e.g., directly connected, hypercube, etc.).

In one embodiment, any of the components of the machine 100 can include hardware, firmware, and/or software for performing the operations described herein. Furthermore, any of the components can include machine-readable media including instructions stored thereon for causing a machine to perform the operations described herein. Machine-readable media includes any mechanism that stores information in a form readable by a machine (e.g., a wagering game machine, computer, etc.). For example, tangible machine-readable media includes read only memory (ROM), RAM, magnetic disk storage media, optical storage media, flash memory, other forms of nonvolatile memory, etc.

The machine 100 also comprises an enabling module 140 which, upon receiving an enabling signal 142, permits memory to be cleared within the machine 100. For example, when the signal 142 is received by the enabling module 140, instructions can be executed by the CPU 126 to clear some or all locations in the NVRAM 138. The content stored within other memory devices within the machine 100 may be selectively cleared as well.

The source 144 of the signal 142 that enables memory clear functionality may comprise a number of devices and mechanisms. For example, the signal 142 may be generated as a result of, for example, opening the logic door on the machine 100, attaching an interface device to the machine 100 (e.g., a universal serial bus (USB) device), detecting the proximate approach to the machine 100 of a wireless, coded maintenance card by an embedded RF (radio frequency) sensor, or some other suitable alternative.

Figure 2:
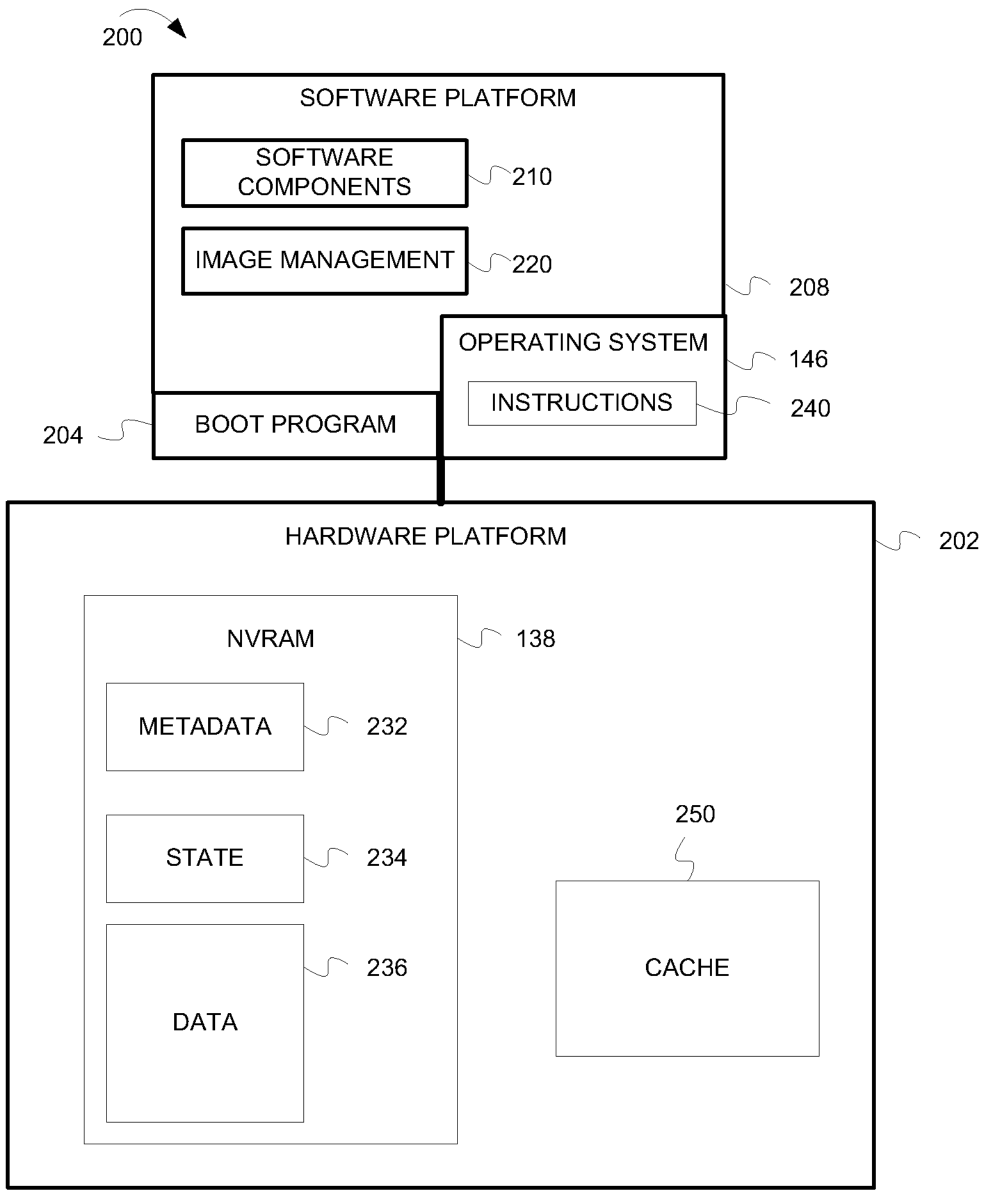
FIG. 2 is a block diagram illustrating wagering game machine architectures according to various embodiments of the invention.

FIG. 2 is a block diagram illustrating wagering game machine architectures 200 according to various embodiments of the invention. As shown in FIG. 2, the architectures 200 may include a hardware platform 202, and a software platform 208.

In various embodiments, the hardware platform 202 may include a thin-client, thick-client, or some intermediate derivation. The hardware platform 202 may also be configured to provide a virtual client.

The software platform 208 may comprise a boot program 204, a base OS 146, one or more wagering game software components 210, and a memory image management component 220. The boot program 204 may include a basic input/output system (BIOS) or other initialization program that works in conjunction with the operating system 146 to provide a software interface to the hardware platform 202. The instructions 240 which, when executed, operate to clear memory may comprise part of the OS 146, or the image management component 220, which in some embodiments may also form a part of the OS 146.

The software framework 208 may include standardized game software components 210 either independent of or in combination with specialized or customized game software components that are designed for a particular wagering game. In one example embodiment, the wagering game software components 210 may include software operative in connection with the hardware platform 202 and OS 146 to present wagering games, such as video poker, video black jack, video slots, video lottery, etc., in whole or part. According to another example embodiment, the software components 210 may include software operative to accept a wager from a player. According to another example embodiment, one or more of the components 210 or 220 may be provided as part of the OS 146 or other software used in the architecture 200 (e.g., libraries, daemons, common services, etc.). Any or all of the components of the machine 100 shown in FIG. 1 may comprise one or more of the components of the architectures 200. For example, the software components 210 may form part of the wagering game software 132 of FIG. 1.

The image management component 220 can manage access to NVRAM 138 and may be used to maintain various data structures and/or images stored in the NVRAM 138. For example, the image management component 220 may be used to maintain metadata 232, game state information 234, and data 236.

Metadata 232 comprises data that describes how state information 234 and/or data 236 is used, and may also include data regarding the structure or organization of data 236. Data 236 may include various types of data or computer instructions useful in the operation of a wagering game machine.

Data 236 may include critical data. Critical data may include one or more of game outcome, credit balance, reel positions, game history, random number generator seeds, game configuration, machine configuration, player information, or other state information or information critical to the operation and record keeping in a gaming machine. The critical data can be stored in the NVRAM 138 to maintain a player's game state in the case of a sudden power failure.

State information 234 comprises state information regarding data 236. In some embodiments, such state information may include state values that indicate whether particular images, data structures, or values stored as data 236 have been initialized, zeroed, validated, and/or whether data structures or values have been or are to be moved or removed.

NVRAM 138 may be maintained as a set of one or more partitions, as a file system, or a combination of the two. For example there may exist a metadata partition, a state partition, and a data partition on NVRAM 138. Each partition may include sub-partitions. The partitions may be composed of blocks of memory; the blocks may have the same size or a variety of block sizes may be used.

A file system may be used to store data on NVRAM 138. An example file system structure on an NVRAM 138 may include a metadata folder or directory, a state folder or directory, and/or a data folder or directory. Each folder or directory may contain files, directories (folders) providing further structure to the file system.

In some embodiments, the hardware platform 202 may include an NVRAM cache 250. The NVRAM cache 250 may be a volatile cache, and may be stored on a storage unit 130 (see FIG. 1) available on a wagering game machine. Examples of such storage units include hard drives, RAM memory, flash memory, compact flash memory or any other type of storage unit now known or developed in the future. Some or all of the data written to NVRAM 138 may be duplicated or cached on NVRAM cache 250, which may be cleared as part of some of the memory clear operations described herein. Thus, many embodiments may be realized.

For example, referring now to FIGS. 1 and 2, it can be seen that an apparatus, such as the machine 100, may comprise one or more processors (e.g., CPU 126 and a memory 128 to store an OS 146. The OS 146, in turn, may include instructions 240 which, when executed, form a memory clear process. The machine 100 may further comprise a nonvolatile memory (e.g., NVRAM 138) and an enabling module 140 to receive a signal 142 that enables execution of the instructions 240 by the processor(s) to clear at least a portion of the nonvolatile memory, and/or some other memory (e.g., memory 128) in the machine 100. Memory may be cleared by writing zeros, ones, negative ones, or some other predetermined bit pattern to the desired portions of the memory.

In order to uninstall a game or theme in some embodiments, the wagering games may be shut down, or play halted on the wagering game machine 100. Files, partitions, or blocks of memory pre-allocated for generic purposes may be selectively cleared, followed by a reloading of content for games or themes that remain on the wagering game machine 100.

The operation of the enabling module 140 can also be used to subsequently initialize the OS 146 to enable receiving a wager from a player in association with a wagering game to be played on a wagering game machine. As noted previously, the instructions 240 may form part of an image management component 220 that is in turn included in the OS 146.

A wagering game machine may comprise both volatile and nonvolatile memory, either or both of which may be cleared in memory clear operations. Nonvolatile memory can take a variety of forms. These include one or more of a solid state memory, a battery-backed memory, a disk drive, combinations of these, and others.

In some embodiments, nonvolatile memory is pre-allocated for a variety of purposes. For example, one or more portions of nonvolatile memory may be pre-allocated and reserved for critical data associated with a wagering game. Further, memory may be pre-allocated and reserved for denomination data, pay table data, etc. Metadata 232 may be used to indicate the purpose and/or amount of memory that has been pre-allocated. In some embodiments, nonvolatile memory may be pre-allocated according to size requirements. For example, the portion of nonvolatile memory that is pre-allocated for critical data may be of sufficient size to hold the largest amount of critical data required by a set of wagering games that are capable of being executed using the wagering game machine architecture 200.

In some embodiments, nonvolatile memory that is cleared may be located in the backplane of a wagering game machine 100. Thus, the nonvolatile memory (e.g., NVRAM 138) may be included in a backplane communicatively coupled to the processor(s) (e.g., CPU 126). The backplane may comprise a set of connections that form part of the I/O bus 122 in some embodiments.

In some embodiments, the nonvolatile memory that is cleared may be accessible to a peripheral of the wagering game machine 100. Thus, the apparatus may comprise a wagering game machine peripheral (e.g., any of the components coupled to the I/O bus 122, such as the value input device 114) operable to access the nonvolatile memory.

Figure 3:
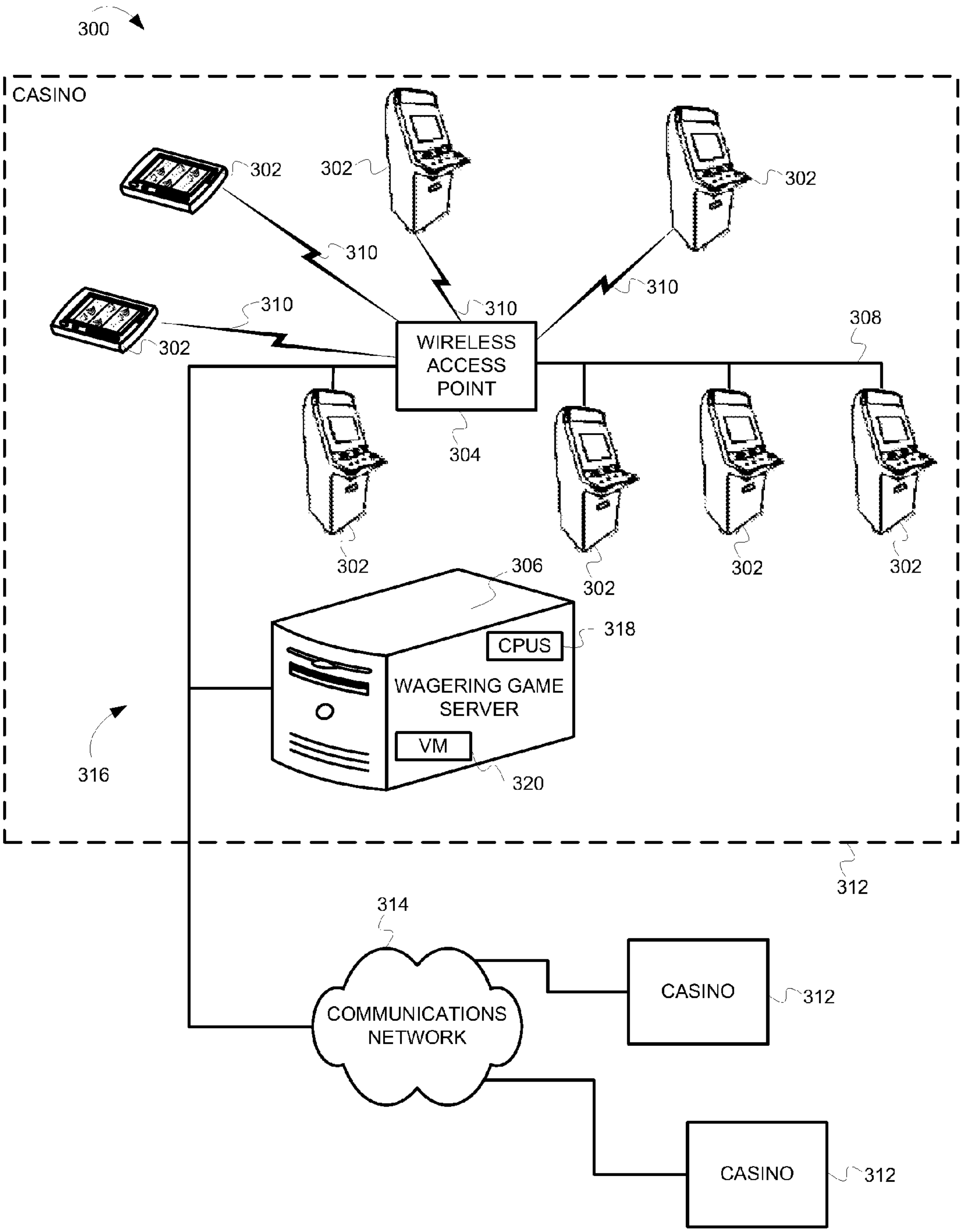
FIG. 3 is a block diagram illustrating a wagering game system, according to various embodiments of the invention.

While FIGS. 1 and 2 describe example embodiments of a wagering game machine, including an arrangement of architectures, FIG. 3 shows how a plurality of wagering game machines 100 can be connected in a wagering game network.

Thus, FIG. 3 is a block diagram illustrating a wagering game system 300, according to various embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, IEEE 802.11, Ethernet, public switched telephone networks, SONET, etc. In one embodiment, the wagering game server 306 can serve wagering games and/or distribute content to devices (e.g., wagering game machines 302) located in other casinos 312 or at other locations on the communications network 314.

The wagering game machines 302 and wagering game server 306 can include hardware and machine-readable media including instructions for performing the operations described herein.

The wagering game machines 302 can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention. The machines 302 may be similar to or identical to the machine 100 of FIG. 1, and may include various components of the architectures 200 of FIG. 2.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present a graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Similarly, memory clear operations for individual ones of the machines 302 may be initiated locally, or remotely, via command from the server 306. Such commands may provide the signal 142 (see FIG. 1) that enables individual machines 302 to execute instructions to clear their memory. Other functionality not directly related to game play may include presentation of advertising, software or firmware updates, system quality or security checks, etc.

Server 306 may comprise an AOM (Administration, Operations, and Maintenance) server. In these embodiments, server 306 may issue commands or respond to requests from wagering games to load software onto a wagering game machine, and may issue commands to cause a wagering game to be rebooted or cause a memory clear operation to occur for a wagering game machine 302, as described below. Thus, additional embodiments may be realized.

For example, in some embodiments, a system 300 may comprise a wagering game server 306 that includes one or more processors 318 communicatively coupled to a memory (e.g., the memory 138 of FIG. 1) storing an OS having instructions forming a memory clear process, wherein the instructions are included in the OS. The processor(s) 318 is/are operable to access at least one nonvolatile memory and an enabling module, which operate as described previously.

The server 306 can operate a wagering game by hosting the game on a virtual machine 320 (which in turn has access to nonvolatile memory located within one or more wagering game machines 302). Thus, the wagering game server 306 may operate the wagering game by hosting a virtual machine 320 that is granted access to a portion of the nonvolatile memory included in a wagering game machine 302.

The system 300 may include a client to receive wagers, and to display the outcome of the wagering game, as generated by the server 306. Thus, the system 300 may comprise one or more clients (e.g., perhaps the machines 302) coupled to the wagering game server 302 by a network 314, the client operable to receive a wager from a player, and to display a wagering game outcome generated by the wagering game server 306. Still further embodiments may be realized.

Wireless Operations

In some embodiments, the wireless access point 304 can form part of a communication station, such as wireless local area network (WLAN) communication station including a Wireless Fidelity (WiFi) communication station, or a WLAN access point (AP). In these embodiments, the wagering game machines 302 can form part of a mobile station, such as WLAN mobile station or a WiFi mobile station.

In some embodiments, the wireless access point 304 can form part of a broadband wireless access (BWA) network communication station, such as a Worldwide Interoperability for Microwave Access (WiMax) communication station, since the wireless access point 304 can be part of almost any wireless communication device. In these embodiments, the wagering game machines 302 can be part of a BWA network communication station, such as a WiMax communication station.

In some embodiments, any of the wagering game machines 302 may comprise a portable wireless communication device, such as a personal digital assistant (PDA), a laptop or portable computer with wireless communication capability, a web tablet, a wireless (e.g., cellular) telephone, a wireless headset, a pager, an instant messaging device, a digital camera, a television or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, among others. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable for communicating in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various ways. For example, all of the components and functionality may reside in a wagering game machine, or various portions may reside in part on a wagering game machine and in part on a server or other network attached device. The scope of the inventive subject matter is meant to include all of these environments and implementations.

Operating Methods

Figure 4:
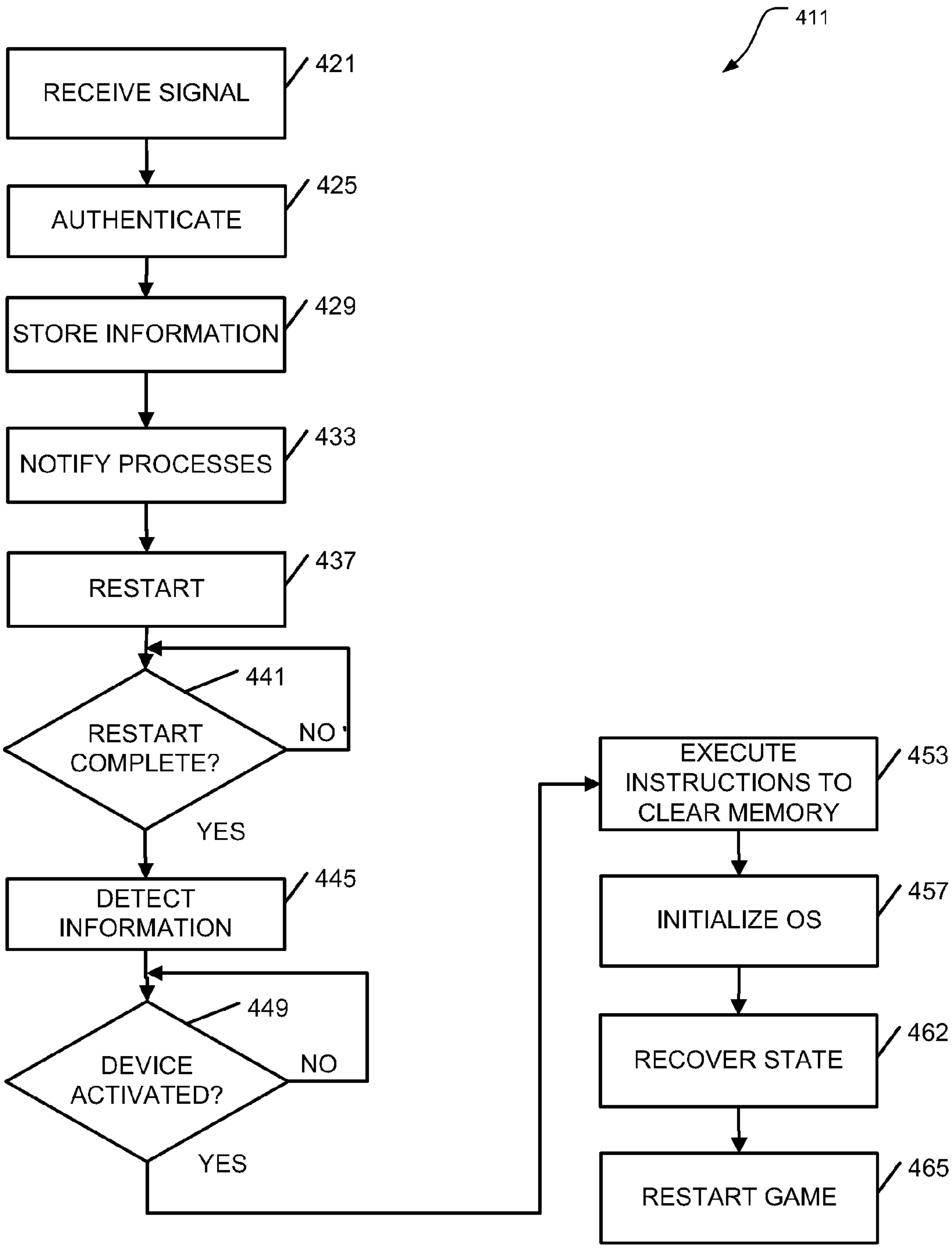
FIG. 4 is a flow diagram illustrating various methods, according to example embodiments of the invention.
Figure 5:
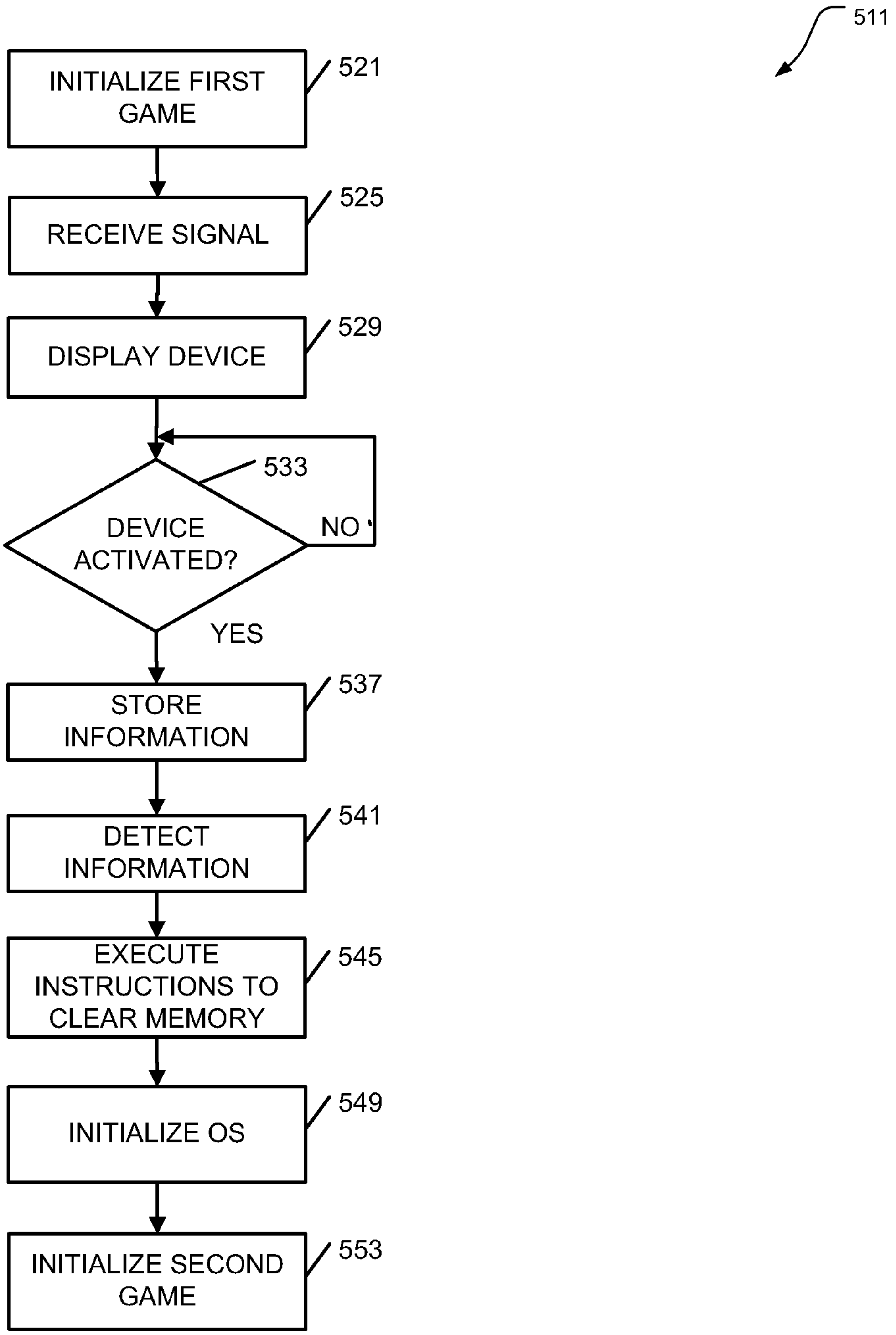
FIG. 5 is a flow diagram illustrating additional methods, according to various embodiments of the invention.

FIGS. 4-5 illustrate methods for managing memory clear operations according to various embodiments of the invention. Referring now to FIGS. 1-5, it is noted that the methods to be performed by an operating environment that includes one or more wagering gaming machines 100 (some of the machines 100 comprising the architecture 200), and the network system 300 may constitute computer programs made up of computer-executable instructions.

Describing the methods by reference to a flow diagram enables one of ordinary skill in the art to develop such programs including instructions to carry out the method on suitable processors for gaming machines (the processor or processors of the computer executing the instructions from computer-readable media). The methods illustrated in FIGS. 4-5 include acts that may be taken by an operating environment executing an embodiment of the invention.

FIG. 4 is a flow diagram illustrating various methods 411, according to example embodiments of the invention. In a basic implementation, a signal is received within a wagering game machine that enables memory clear operations to begin, such that instructions to clear the memory can be executed if all other conditions are satisfied (e.g., the source of the signal is authenticated, etc.). Once the instructions to clear the memory are executed, the same OS that includes the memory clear instructions may be initialized to restart the prior wagering game, or to begin a new wagering game. Authentication mechanisms are well-known to those of ordinary skill in the art.

Thus, in some embodiments, a method 411 of clearing memory may begin at block 421 with receiving a signal to enable execution of instructions forming a memory clear process, wherein the instructions are included in an OS of a wagering game machine.

The identity of the person/entity providing the enabling signal may be authenticated prior to allowing the signal to be presented. Thus, the method 411 may continue on to block 425 with authenticating an identity associated with providing the signal.

Once the enabling signal is received, that fact (i.e., that reception has occurred) can be stored prior to restarting the wagering game machine. After restart, the stored fact can be detected, at which time the memory is cleared. Thus, the method 411 may continue on to block 429 to include, responsive to the receiving, storing information to indicate that execution of the instructions to clear memory has been enabled.

In some embodiments, prior to executing a memory clear operation, one or more running processes can be alerted to store the operating state of the machine. For example, some of the running processes may be operating in conjunction with a database that is erased when memory clear activity occurs. Thus, the method 411 may continue on to block 433 to include, prior to the executing, notifying at least one process running under the OS that the execution of a memory clear operation is imminent, so that the operating state of various processes associated with the wagering game can be stored prior to the execution of the memory clear instructions.

In some embodiments, the method 411 may continue on to block 437, to include restarting the wagering game machine. Once the restart is complete, as determined at block 441, the method 411 may continue on to block 445.

At block 445, the method 411 may include detecting existence of the information that has been stored (e.g., to indicate that the enabling signal was previously received). In some embodiments, the fact of receiving the enabling signal can be stored in a backplane memory. Thus, the activity at block 445 may comprise detecting existence of information stored in a memory associated with the backplane of the wagering game machine. The existence of this information (e.g., recorded as a bit or flag that has been set or cleared) indicates that the execution of memory clear instructions has been enabled.

Memory clear operations may be enabled upon the satisfaction of additional conditions, for example, by activating a manual device (e.g., toggling a switch, opening a door (such as a wagering game machine logic door), turning on a wireless device and approaching within some selected distance of a wagering game machine, operating a touch screen widget on the display of a wagering game, etc.). Thus, as determined at block 449, the instructions to clear memory may be executed in some embodiments only if a manual device associated with the wagering game machine is activated.

The method 411 may continue on to block 453 with executing the instructions (by one or more processors) to clear at least a portion of nonvolatile memory and/or other memory, in the wagering game machine. The instructions may be executed in response to the activity of detecting the presence of information (see block 445), prior to initializing the OS (see block 457).

Memory clear operations can be selective. Thus, in some embodiments, game space assets are preserved, and not cleared. Therefore, the activity at block 453 may comprise preserving game space assets stored in the memory that is to be cleared by refraining from clearing information stored in addresses of the memory that are associated with game space assets.

Memory clear operations may include clearing critical data stored in the memory. Thus, the portion of the memory that is cleared may include critical data that was stored therein, prior to the execution of the instructions that clear the memory.

The method 411 may continue on to block 457 with initializing the OS to enable receiving a wager from a player in association with a wagering game to be played on the wagering game machine.

In some embodiments, after the memory clear operation is complete, the machine may be restarted, the operating state recovered, and the game restarted. Thus, the method 411 may continue on to block 462 to include recovering the operating state of the wagering game machine. The method 411 may also continue on to block 465 to include restarting the wagering game (e.g., that may have been halted prior to executing the memory clear instructions at block 453).

FIG. 5 is a flow diagram illustrating additional methods 511, according to various embodiments of the invention. For example, a first wagering game may be initialized for play. Thereafter, memory clear operations may be enabled, so that the memory is cleared. After that, a second game may be initialized for play.

Thus, in some embodiments, a method 511 to manage memory clear operations may begin at block 521 with initializing a first wagering game operable to display a gaming outcome on a wagering game machine in response to receiving a first wager of monetary value. The first wagering game may operate to store critical data in a nonvolatile memory.

The method 511 may continue on to block 525 with receiving a signal to enable execution of instructions forming a memory clear process, wherein the instructions are included in an OS that executes to initialize the first wagering game.

Memory clear operations can be enabled by opening a door, such as a logic door, or plugging an interface device, such as a USB device (e.g., jump drive or dongle), into the wagering game machine. Thus, the activity at block 525 may comprise receiving an enabling signal indicating that a door of the wagering game machine is open, or an interface device has been plugged into the wagering game machine.

Memory clear operations can be enabled by receiving the signal as a message, and the type of message received can affect the specific way the memory clear operation is implemented. For example, commands to enable clearing the memory in the wagering game machine may be received at a wagering game machine from a wagering game server on a wagering game network. These commands may comprise a memory clear and hold operation (e.g., where the machine operates to clear the memory, but does not reset), or a memory clear and reset operation (e.g., where the machine operates to clear the memory, and then resets). Thus, the activity at block 525 may comprise receiving the signal as a message requesting a memory clear and hold operation, or a memory clear and reset operation.

The violation of a business operation rule, such as receiving invalid data at a processor within a wagering game machine, or at a wagering game server from a client wagering game machine, during operation of a wagering game, may be used to enable memory clear operations. Thus, the activity at block 525 may comprise receiving the signal as an indication that a business operation rule has been violated during operation of the wagering game.

A widget can be displayed as a button on a display screen (e.g., a touch screen) which, when activated, permits memory clear operations to proceed. Thus, the method 511 may continue on to blocks 529 and 533 with displaying a manual activation device on a display screen of a wagering game machine, and executing (or at least enabling the execution of) the instructions to clear memory when the manual activation device is activated.

Reading information stored in the backplane, such as a bit or flag, can also be used to enable memory clear operations. Thus, the method 511 may continue on to blocks 537 and 541 to include, prior to the execution of memory clear instructions, storing information in a memory electrically coupled to the backplane of the wagering game machine (e.g., at block 537), wherein reading the information results in enabling the execution.

The method 511 may continue on to block 545 to include executing the instructions by at least one processor to clear at least a portion of the memory (e.g., nonvolatile memory). The portion of the memory that is cleared may include instructions forming at least a portion of the first wagering game. Memory may be cleared by positively writing logical zeroes to the memory, as well as in other ways.

The method 511 may continue on to block 549 to include initializing the OS to enable receiving a second wager of monetary value in association with a second wagering game, which may be initialized at block 553.

The methods described herein do not have to be executed in the order described, or in any particular order. In some embodiments, several of the activities described with respect to the methods may be left out. Moreover, various activities described with respect to the methods identified herein can be executed in repetitive, serial, or parallel fashion. The individual activities of the apparatus 100, architecture 200, and system 300, as shown in the methods of FIGS. 4-5, can also be combined with each other and/or substituted, one for another, in various ways. Information, including parameters, commands, operands, and other data, can be sent and received in the form of one or more carrier waves. Thus, many other embodiments may be realized.

Wagering Game Machines and Systems

Figure 6:
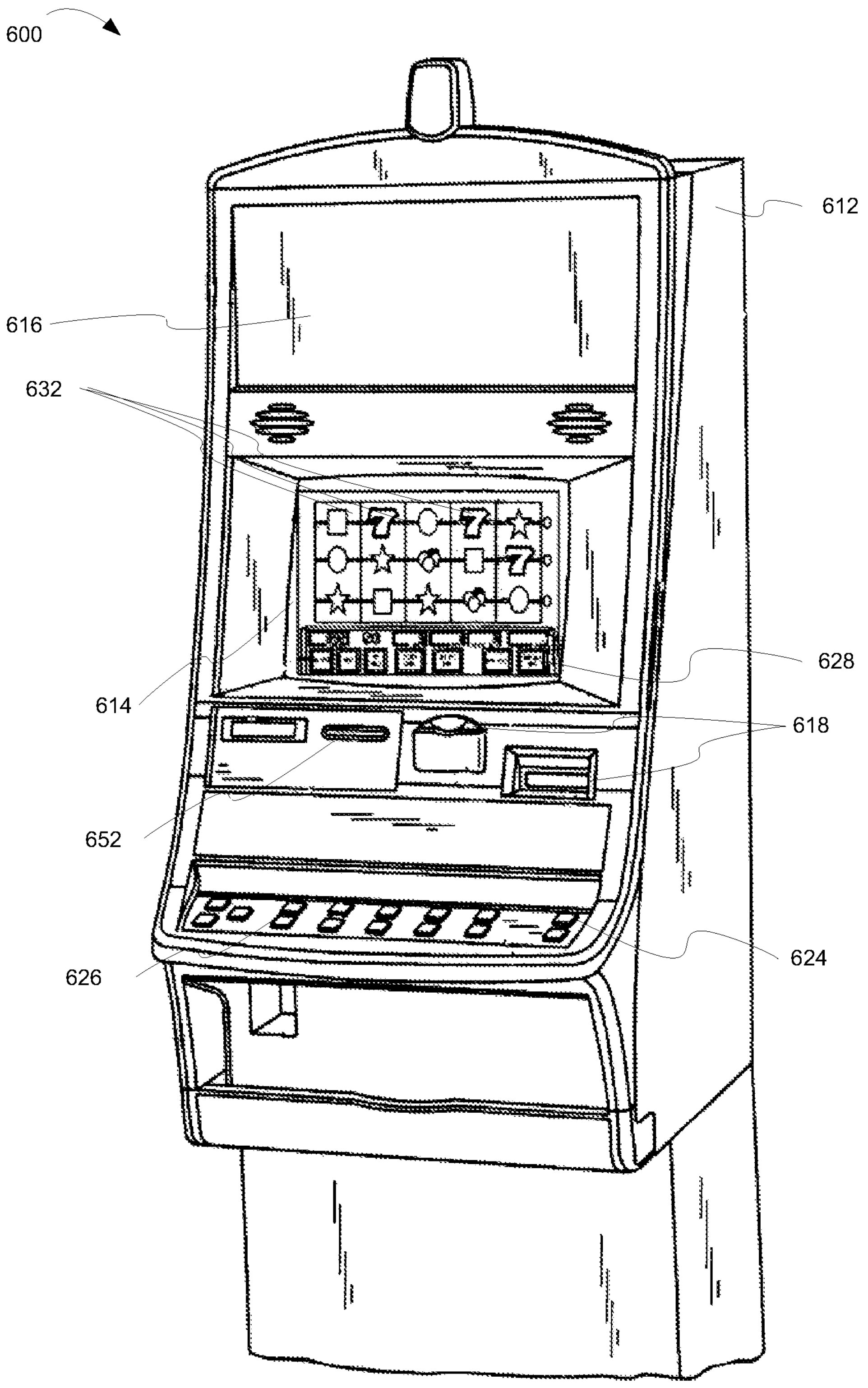
FIG. 6 is a perspective view of a wagering game machine, according to various embodiments of the invention.

FIG. 6 is a perspective view of a wagering game machine 600, according to various embodiments of the invention. The wagering game machine 600 may be used in gaming establishments, such as casinos. According to various embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, etc. In some embodiments, the wagering game machine 600 is similar to or identical to the machine 100 of FIG. 1, and/or incorporates the architecture 200 of FIG. 2.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bartop model, mobile handheld model, or workstation console model. Further, in some embodiments, the wagering game machine 600 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 618. The player can initiate play by using the player input device's buttons or touch screen 628. The basic game can include arranging a plurality of symbols along a payline 632, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc. The information reader 652, the value input device 618, and/or the player input device 624, among other devices, can be used to send or receive signals that enable memory clear operations.

Portable Wagering Game Machines

Figure 7:
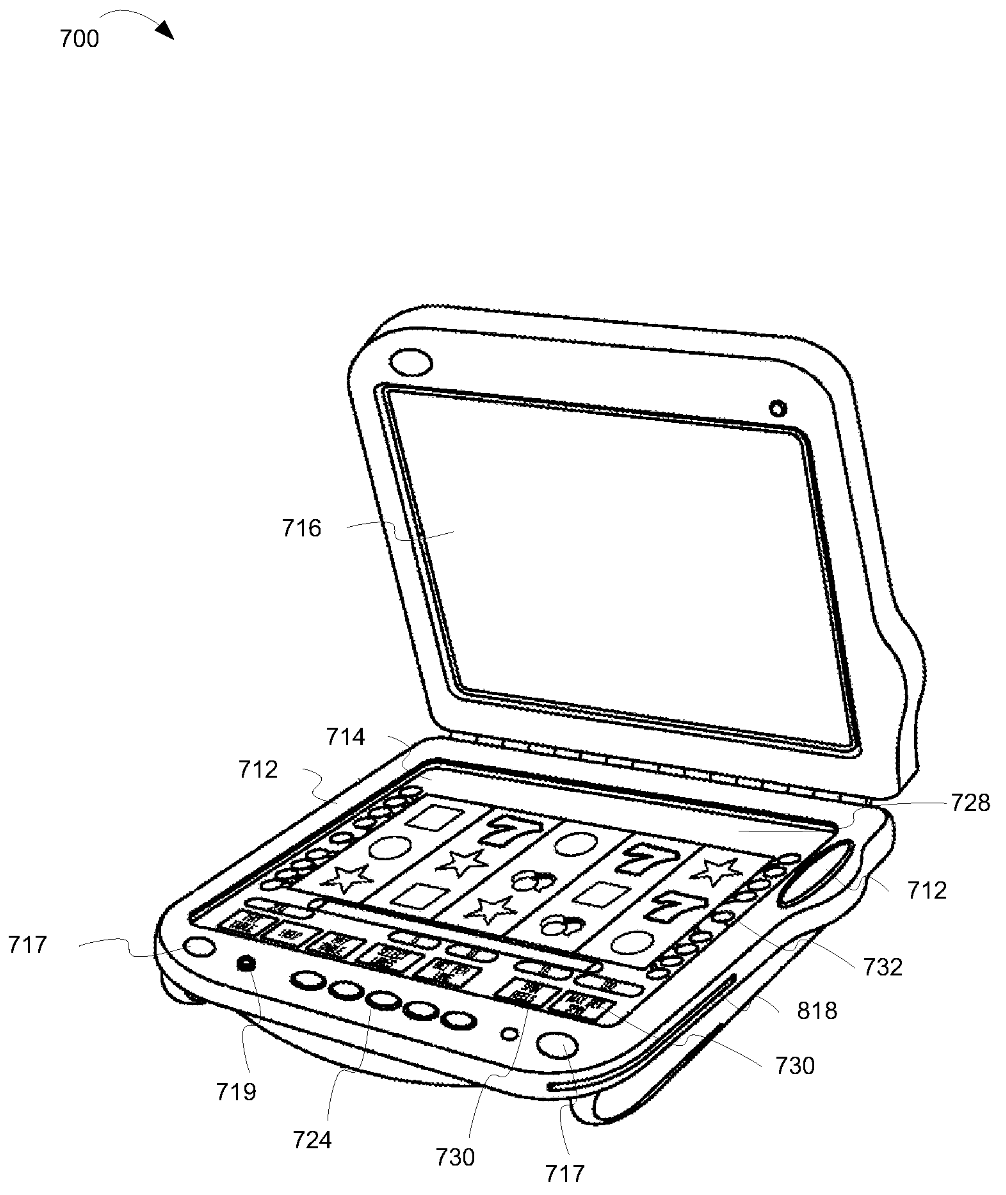
FIG. 7 is a perspective view of a portable wagering game machine, according to various embodiments of the invention.

FIG. 7 is a perspective view of a portable wagering game machine 700, according to various embodiments of the invention. The portable wagering game machine 700 can include any suitable electronic handheld or mobile device configured to play a video casino game such as blackjack, slots, keno, poker, blackjack, and roulette. The wagering game machine 700 comprises a housing 712 and includes input devices, including a value input device 718 and a player input device 724. For output, the wagering game machine 700 includes a primary display 714, and may include a secondary display 716, one or more speakers 717, one or more player-accessible ports 719 (e.g., an audio output jack for headphones, a video headset jack, etc.), and other conventional I/O devices and ports, which may or may not be player-accessible. In the embodiment depicted in FIG. 7, the wagering game machine 700 includes a secondary display 716 that is rotatable relative to the primary display 714. The optional secondary display 716 can be fixed, movable, and/or detachable/attachable relative to the primary display 714. Either the primary display 714 and/or secondary display 716 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 718 can comprise, for example, a slot located on the front, side, or top of the casing 712 configured to receive credit from a stored-value card (e.g., casino card, smart card, debit card, credit card, etc.) inserted by a player. The player-accessible value input device 718 can also comprise a sensor (e.g., an RF sensor) configured to sense a signal (e.g., an RF signal) output by a transmitter (e.g., an RF transmitter) carried by a player. The player-accessible value input device 718 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 700.

Still other player-accessible value input devices 718 can require the use of touch keys 730 on the touch-screen display (e.g., primary display 714 and/or secondary display 716) or player input devices 724. Upon entry of player identification information and, preferably, secondary authorization information (e.g., a password, PIN number, stored value card number, predefined key sequences, etc.), the player can be permitted to access a player's account. As one potential optional security feature, the wagering game machine 700 can be configured to permit a player to only access an account the player has specifically set up for the wagering game machine 700. Other conventional security features can also be utilized to, for example, prevent unauthorized access to a player's account, to minimize an impact of any unauthorized access to a player's account, or to prevent unauthorized access to any personal information or funds temporarily stored on the wagering game machine 700. The value input device 718 and/or the player input devices 724, among other devices, can be used to send or receive signals that enable memory clear operations.

The player-accessible value input device 718 can itself comprise or utilize a biometric player information reader which permits the player to access available funds on a player's account, either alone or in combination with another of the aforementioned player-accessible value input devices 718. In an embodiment wherein the player-accessible value input device 718 comprises a biometric player information reader, transactions such as an input of value to the wagering game machine 710, a transfer of value from one player account or source to an account associated with the wagering game machine 700, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 718 comprising a biometric player information reader can require a confirmatory entry from another biometric player information reader 752, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 718 can be provided remotely from the wagering game machine 710.

The player input device 724 may include a plurality of push buttons on a button panel for operating the wagering game machine 700. In addition, or alternatively, the player input device 724 can comprise a touch screen mounted to the primary display 714 and/or secondary display 716. In one aspect, the touch screen is matched to a display screen having one or more selectable touch keys 730 selectable by a user's touching of the associated area of the screen using a finger or a tool, such as a stylus pointer. A player enables a desired function either by touching the touch screen at an appropriate touch key 730 or by pressing an appropriate push button on the button panel. The touch keys 730 can be used to implement the same functions as push buttons. Alternatively, the push buttons 726 can provide inputs for one aspect of the operating the game, while the touch keys 730 can allow for input needed for another aspect of the game. The various components of the wagering game machine 700 can be connected directly to, or contained within, the casing 712, as seen in FIG. 7, or can be located outside the casing 712 and connected to the casing 712 via a variety of wired (tethered) or wireless connection methods. Thus, the wagering game machine 700 can comprise a single unit or a plurality of interconnected (e.g., wireless connections) parts which can be arranged to suit a player's preferences.

The operation of the basic wagering game on the wagering game machine 700 is displayed to the player on the primary display 714. The primary display 714 can also display a bonus game associated with the basic wagering game. The primary display 714 preferably takes the form of a high resolution LCD, a plasma display, an LED, or any other type of display suitable for use in the wagering game machine 700. The size of the primary display 714 can vary from, for example, about a 2"-3" display to a 15" or 17" display. In at least some embodiments, the primary display 714 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 714 and/or secondary display 716 can have a 16:9 aspect ratio or other aspect ratio (e.g., 4:3). The primary display 714 and/or secondary display 716 can also each have different resolutions, different color schemes, and different aspect ratios.

A player typically begins play of the basic wagering game on the wagering game machine 700 by making a wager (e.g., via the value input device 718 or an assignment of credits stored on the portable wagering game machine 700 via the touch screen keys 730, player input device 724, or buttons 726) on the wagering game machine 700. In some embodiments, the basic game can comprise a plurality of symbols arranged in an array, and includes at least one payline 732 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 718 of the wagering game machine 700 can double as a player information reader 752 that allows for identification of a player by reading a card with information indicating the player's identity (e.g., reading a player's credit card, player ID card, smart card, etc.). The player information reader 752 can alternatively or also comprise a bar code scanner, RFID transceiver or computer readable storage medium interface. In one embodiment, the player information reader 752 comprises a biometric sensing device.

In some embodiments, a portable wagering game machine 700 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

CONCLUSION

Thus, in various embodiments, the instructions that, when executed, operate to clear memory within a wagering game machine may be integrated into the base OS of the machine. This integrated functionality can reduce or eliminate the use of conventional memory clear operations, where machine operators act to turn off the machine, physically replace an OS compact flash card with a RAM Clear compact flash card (e.g., that contains the instructions for memory clear operations), and then boot up the machine to execute the instructions in the RAM Clear compact flash card. As a result, the time used to power down and boot up the machine when the OS compact flash card is replaced may also be reduced or eliminated.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

In the Detailed Description, reference is made to specific examples by way of drawings and illustrations. These embodiments, which are also referred to herein as "examples," are described in sufficient detail to enable those of ordinary skill in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
- receiving a signal including information indicative of a selection of a memory clear process of a plurality of different memory clear processes, the information indicating that execution of the selected memory clear process is enabled, wherein instructions that cause the selective execution of each of the plurality of different memory clear processes are included in an operating system of a wagering game machine;
- responsive to receiving the signal, storing information to indicate the execution has been enabled;
- restarting the wagering game machine;
- after the restarting, detecting existence of the stored information;
- executing the instructions in the operating system by at least one processor to clear at least a portion of nonvolatile memory in the wagering game machine in response to detecting the existence of the stored information after the restarting; and
- initializing the operating system to enable receiving a wager from a player in association with a wagering game to be played on the wagering game machine, wherein initializing occurs after executing the instructions to clear the portion of nonvolatile memory.

2. The method of claim 1, further comprising, prior to storing the information, authenticating an identity associated with providing the signal.

3. The method of claim 1, wherein
- the information is stored in a memory associated with a backplane of the wagering game machine to indicate that the execution has been enabled.

4. The method of claim 1, wherein executing the selected memory clear process includes preserving game space assets stored in the nonvolatile memory by refraining from clearing information stored in addresses of the nonvolatile memory that are associated with the game space assets.

5. The method of claim 1, wherein the portion of nonvolatile memory includes critical data prior to the executing.

6. The method of claim 1, further comprising, prior to executing the selected memory clear process, notifying at least one process running under the operating system that the execution is imminent, so that an operating state of the wagering game can be stored in a memory prior to the executing.

7. The method of claim 6, further comprising, after restarting the wagering game machine, recovering the operating state, and restarting the wagering game at the recovered operating state.

8. A computer-implemented method of selectively enabling a memory clear operation, the method, comprising:
- initializing a first wagering game operable to display a gaming outcome on a wagering game machine in response to receiving a first wager of monetary value, the first wagering game storing critical data in nonvolatile memory;
- receiving, at a wagering game machine, a signal indicative of a selection of a memory clear process of a plurality of different memory clear processes, wherein instructions that cause the selective execution of each of the plurality of different memory clear processes are included in an operating system that executes to initialize the first wagering game;
- responsive to receiving the signal, storing information enabling the execution of the selected memory clear process;
- after storing the information, restarting the wagering game machine;
- after the restarting and in response to detecting the stored information, executing, by at least one processor of the wagering game machine, some of the instructions in the operating system to clear at least a portion of the nonvolatile memory that includes instructions forming at least a portion of the first wagering game; and
- initializing the operating system to enable receiving a second wager of monetary value in association with a second wagering game.

9. The method of claim 8, further comprising:
- displaying a manual activation device on a display screen of the wagering game machine and executing the selected memory clear process in response to the manual activation device being activated.

10. The method of claim 8, wherein the received signal further indicates that a door of the wagering game machine is open or an interface device has been plugged into the wagering game machine.

11. The method of claim 8, wherein the received signal indicates a selection of either a memory clear and hold operation or a memory clear and reset operation.

12. The method of claim 8, wherein the received signal further indicates that a business operation rule has been violated during operation of the first wagering game.

13. The method of claim 8, wherein the information is stored in a memory electrically coupled to a backplane of the wagering game machine.

14. The method of claim 8, wherein the selected memory clear process includes writing logical zero values to at least the portion of the nonvolatile memory.

15. A wagering game machine comprising:

at least one processor; and one or more memory devices storing an operating system that includes instructions that cause the selective execution of each of a plurality of memory clear processes; wherein the operating system, when executed by the at least one processor, causes the wagering game machine to:

receive a signal indicative of a selection of a memory clear process of the plurality of memory clear processes, store information enabling the execution of the selected memory clear process, after a subsequent restart of the gaming machine, detect the stored information, in response to detecting the stored information, execute the selected memory clear process of at least a portion of nonvolatile memory of the wagering game machine, and initialize the operating system to enable receiving a wager from a player in association with a wagering game to be played on the wagering game machine.

16. The apparatus of claim 15, wherein the instructions form part of an image management component included in the operating system.

17. The apparatus of claim 15, wherein the nonvolatile memory comprises at least one of a solid state memory, battery-backed memory, or a disk drive.

18. The apparatus of claim 15, wherein the nonvolatile memory is included in a backplane communicatively coupled to the at least one processor.

19. The apparatus of claim 15, further comprising a wagering game machine peripheral operable to access the nonvolatile memory.

20. A gaming system, comprising:

a wagering game server including at least one processor, the wagering game server being communicatively coupled to a non-volatile memory device that stores an operating system including instructions that cause the selective execution of each of a plurality of memory clear processes, the operating system, when executed by the at least one processor, causing the wagering game server to:

receive a signal indicative of a selection of a memory clear process of the plurality of different memory clear processes;

store information enabling the execution of the selected memory clear process, and restart the operating system of the wagering game server;

after restarting the operating system and in response to detecting the stored information, execute the selected memory clear process of the non-volatile memory device according to the instructions included in the operating system; and initialize the operating system to enable receiving a wager from a player in association with a wagering game.

21. The system of claim 20, wherein the wagering game server operates the wagering game by hosting a virtual machine that is granted access to at least a portion of the nonvolatile memory device.

22. The system of claim 20, further comprising:

a client coupled to the wagering game server by a network, the client operable to receive the wager from the player, and to display a wagering game outcome generated by the wagering game server.

* * * * *